J. DUPRA
ANIMAL TRAP.
APPLICATION FILED OCT. 23, 1920.

1,436,486.

Patented Nov. 21, 1922.

Inventor
John Dupra
By
Attorney

Patented Nov. 21, 1922.

1,436,486

UNITED STATES PATENT OFFICE.

JOHN DUPRA, OF GUENETTE, QUEBEC, CANADA.

ANIMAL TRAP.

Application filed October 23, 1920. Serial No. 419,005.

*To all whom it may concern:*

Be it known that I, JOHN DUPRA, a British subject, residing at Guenette, in the county of Labelle, in the Province of Quebec, in the Dominion of Canada, have invented certain new and useful Improvements in Animal Traps; and I do hereby declare that the following is a full, clear, and exact description of the same.

The present invention relates to improvements in animal traps, and its main object is to provide a simple and inexpensive device of this character which will practically instantly kill an animal when trapped or at least prevent the animal from escaping.

To better understand the invention reference should be had to the accompanying drawings, in which:—

Like numerals of reference indicate corresponding parts in all of the figures.

Figure 1:
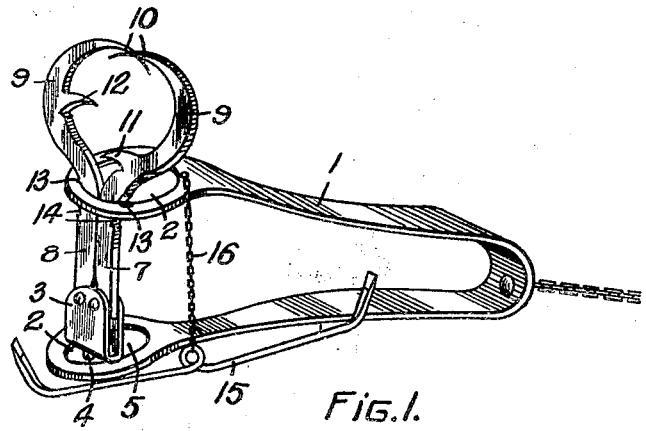
Figure 1 is a perspective view of the trap when in its closed position.

Referring to the drawings, 1 is a metal plate curved so as to form a powerful spring, each end of which is provided with an enlarged perforated portion or eye 2. On the lower eye 2 rests an upstanding U-shaped bracket 3 which is held in place and connected to said eye by means of a pin 4, said pin passing through the eye opening and through a perforation in a disk 5 arranged against the under face of the eye, the projecting lower end of the pin carrying a nut 6 which is tightened against said disk. The bracket 3 is adapted to receive the gripping members 7 and 8, which are pivotally connected thereto, said members projecting through the upper eye 2.

Each of the gripping members 7 and 8, consists of a stem terminating in a hook 9 having a very sharp point 10. When the two members are pivotally secured in the bracket 3 and are closed, the sharp points 10 will tend to overlap one another, so that an animal caught between said members will be gripped by the hooks 9.

Intermediate of said sharp points 10, are secured prongs 11 and 12, one on each of the gripping jaws or members, and preferably arranged one below the other, which are also adapted to grip the animal and hold him more tightly; or if the animal is too small to be caught by the top prongs or hooks 9, then the said prongs 11 and 12 will grip him.

The upper eye 2 is provided with a slot 13 at each side thereof, in which slots the members 7 and 8 engage, said members being provided with a plurality of notches 14 on their outer edges for cooperation with the slots, so that when the spring is released and the members 7 and 8 are closed, the edges of the slots will engage the notches 14 and lock the spring.

To hold the members 7 and 8 in their operative position, a spreading member 15 is used which consists of a metal bar having curved ends, said bar being adapted to engage in between the prongs 11 and 12. A chain 16 is adapted to secure the bar 15 to the spring 1.

Figure 2:
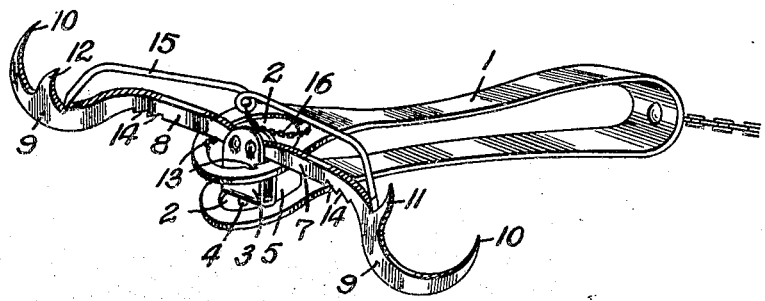
Figure 2 is a perspective view of the trap when set ready to operate.
Figure 3:
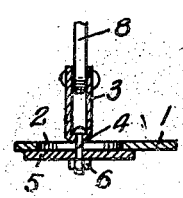
Figure 3 is a detail sectional view showing the mounting of the bracket to which the gripping members are pivoted.

It will readily be seen that in operating the device, the jaws or members 7 and 8 are spread out as indicated in Figure 2 and the spreading member 15 is placed between the prongs. When an animal strikes against this spreading member 15, it is disengaged from the said prongs and thus releases the jaws which are immediately closed by the spring 1 and caused to grip the animal which is either killed or severely wounded thereby.

What I claim as my invention is:

1. An animal trap, comprising an operating spring embodying upper and lower arms, the former of which has a terminal eye provided with a pair of oppositely located slots; a pair of gripping jaws each having a single straight stem portion pivotally connected with the lower arm immediately below said eye; said stem portions adapted to extend upwardly through said eye when in closed position; and projecting into said slots at such time and having their outer edges formed with notches for immediate engagement with the inner edges of the slots, whereby said jaws are positively locked in closed position; and means for releasably holding said jaws in open position.

2. An animal trap, comprising an operating spring embodying upper and lower arms, the former of which has a terminal eye provided with a pair of oppositely located slots; a pair of gripping jaws each having a single straight stem portion pivotally connected with the lower arm immediately below said eye; said jaws having impaling devices formed thereon, and said stem portions adapted to extend upwardly through said eye when said jaws are in closed position and projecting into said slots at such time and having their outer edges formed with notches for immediate engagement with the inner edges of the slots, whereby said jaws are positively locked in closed position; and a spreading member engageable at opposite ends with said impaling devices to hold said jaws in extended position, but releasable therefrom on being struck by an animal to enable said upper spring arm to swing said jaws upwardly toward each other into closed position.

Signed at Montreal, Quebec, Canada, this 28th day of September, 1920.

JOHN X DUPRA.
(his mark)

Witnesses:
C. PATENAUDE,
A. HUVIE.